US011279356B2

(12) United States Patent
Stuetzler et al.

(10) Patent No.: US 11,279,356 B2
(45) Date of Patent: Mar. 22, 2022

(54) VEHICLE DYNAMICS CONTROL SYSTEM UTILIZING HEADING ERROR AND DERIVATIVE

(71) Applicant: Robert Bosch GmbH, Stuttgart (DE)

(72) Inventors: Frank Juergen Stuetzler, South Lyon, MI (US); Jack Nathan Miller, Talheim (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 16/578,875

(22) Filed: Sep. 23, 2019

(65) Prior Publication Data

US 2021/0086770 A1   Mar. 25, 2021

(51) Int. Cl.
*B60W 30/18* (2012.01)
*B60W 10/18* (2012.01)
*B60W 10/20* (2006.01)

(52) U.S. Cl.
CPC ............ *B60W 30/18* (2013.01); *B60W 10/18* (2013.01); *B60W 10/20* (2013.01); *B60W 2400/00* (2013.01); *B60W 2420/40* (2013.01); *B60W 2420/52* (2013.01); *B60W 2520/14* (2013.01); *B60W 2540/18* (2013.01); *B60W 2720/14* (2013.01)

(58) Field of Classification Search
CPC ....... B60T 8/00; B60W 10/18; B60W 10/184; B60W 10/20; B60W 2400/00; B60W 2420/40; B60W 2420/52; B60W 2520/06; B60W 2520/14; B60W 2540/18; B60W 2710/182; B60W 2710/207; B60W 2720/14; B60W 2720/24; B60W 2720/40; B60W 30/045; B60W 30/18; B60W 30/18145; B60W 40/114; B62D 15/025
See application file for complete search history.

(56) References Cited

U.S. PATENT DOCUMENTS

| 5,747,683 | A | 5/1998 | Gerum et al. |
| 5,859,774 | A | 1/1999 | Kuzuya et al. |
| 5,906,645 | A | 5/1999 | Kagawa et al. |
| 7,835,832 | B2 * | 11/2010 | Macdonald .......... A01B 79/005 701/24 |
| 8,301,343 | B2 * | 10/2012 | Tanimoto .................. B60T 8/48 701/43 |
| 9,645,577 | B1 * | 5/2017 | Frazzoli ............ B60W 30/0956 |
| 10,166,985 | B2 * | 1/2019 | Krueger .............. B60W 30/146 |

(Continued)

FOREIGN PATENT DOCUMENTS

| CN | 101973313 A | | 2/2011 |
| CN | 106843212 B | * | 1/2020 |

(Continued)

*Primary Examiner* — Babar Sarwar
(74) *Attorney, Agent, or Firm* — Michael Best & Friedrich LLP (57) ABSTRACT

Systems and methods for controlling a vehicle. The system includes a plurality of sensors and an electronic controller. The electronic controller is configured to receive data from the plurality of sensors and determine a target vehicle travel direction of the vehicle based on the received data. The electronic controller then determines a heading error based on the target travel direction, determines a heading error derivative, and generates a vehicle control command based on the heading error and the heading error derivative.

18 Claims, 4 Drawing Sheets

(56) References Cited

U.S. PATENT DOCUMENTS

| | | | |
|---|---|---|---|
| 2018/0009470 A1* | 1/2018 | Meyer | B60W 10/04 |
| 2018/0354513 A1* | 12/2018 | Moshchuk | G05D 1/0229 |
| 2018/0362022 A1 | 12/2018 | Kasaiezadeh Mahabadi et al. | |
| 2019/0118829 A1* | 4/2019 | Goldberg | B60W 50/06 |
| 2019/0143998 A1* | 5/2019 | Moran | B60W 50/0097 |
| | | | 701/48 |
| 2019/0276008 A1* | 9/2019 | Yang | B60W 30/18145 |
| 2019/0339700 A1* | 11/2019 | Berg | B63H 9/061 |
| 2019/0375450 A1* | 12/2019 | Medagoda | A01B 69/004 |
| 2021/0000004 A1* | 1/2021 | Robinson | G01S 19/53 |

FOREIGN PATENT DOCUMENTS

| | | | |
|---|---|---|---|
| JP | 63314617 A | 12/1988 | |
| JP | 2270006 A | 11/1990 | |
| JP | 3276210 A | 12/1991 | |

* cited by examiner

VEHICLE DYNAMICS CONTROL SYSTEM UTILIZING HEADING ERROR AND DERIVATIVE

Embodiments relate to a vehicle dynamics control system utilizing heading error and derivative of a heading error.

BACKGROUND

State of the art vehicle dynamics control (VDC) systems measure vehicle yaw rate and a steering angle of the vehicle input by a driver to determine vehicle stability and derive variables related to vehicle stability to assist in controlling the vehicle. Generally, these variables are approximations derived from driver steering wheel angle, lateral and longitudinal velocity, yaw rate, and other vehicle data.

SUMMARY

Some variables, in particular a vehicle body slip angle, can become inaccurate over time due to simplified algorithms for vehicle models and sensor tolerances. Therefore, current VDC systems can only limit the increase of the vehicle body slip angle but not control the vehicle to a particular body slip angle. This is especially evident when the vehicle loses stability due to road conditions, sudden changes in road conditions, excessive speed, or sudden changes in driving direction, such as attempting to avoid an obstacle.

Among other things, embodiments described herein improve deficiencies of current VDC systems, especially in highly-autonomous driving ("HAD") vehicles. One example embodiment includes a VDC system for a HAD vehicle equipped with a plurality of sensors, such as radar sensors, LIDAR sensors, video cameras, and others. Information from these sensors is used to determine a direction the vehicle is supposed to travel, such as a known driving direction of a road or other driving surface, and also determine the direction the vehicle is actually heading. The VDC system determines when the vehicle diverges from the intended driving direction based on input from the sensors. When this occurs, the VDC system can take actions to bring the vehicle back onto the correct driving direction.

One embodiment provides a vehicle dynamics control system for a vehicle. The system includes a plurality of sensors and an electronic controller. The electronic controller is configured to receive data from the plurality of sensors and determine a target vehicle travel direction of the vehicle based on the received data. The electronic controller then determines a heading error based on the target travel direction, determines a heading error derivative, and generates a vehicle control command based on the heading error and the heading error derivative.

Another embodiment provides a method for controlling a vehicle. The method includes receiving, with an electronic controller, data from a plurality of sensors and determining, with the electronic controller, a target vehicle travel direction of the vehicle based on the received data. The method also includes determining, with the electronic controller, a heading error from the target vehicle travel direction and determining, with the electronic controller, a heading error derivative. The method further includes generating, with the electronic controller, a vehicle control command based on the heading error and the heading error derivative.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
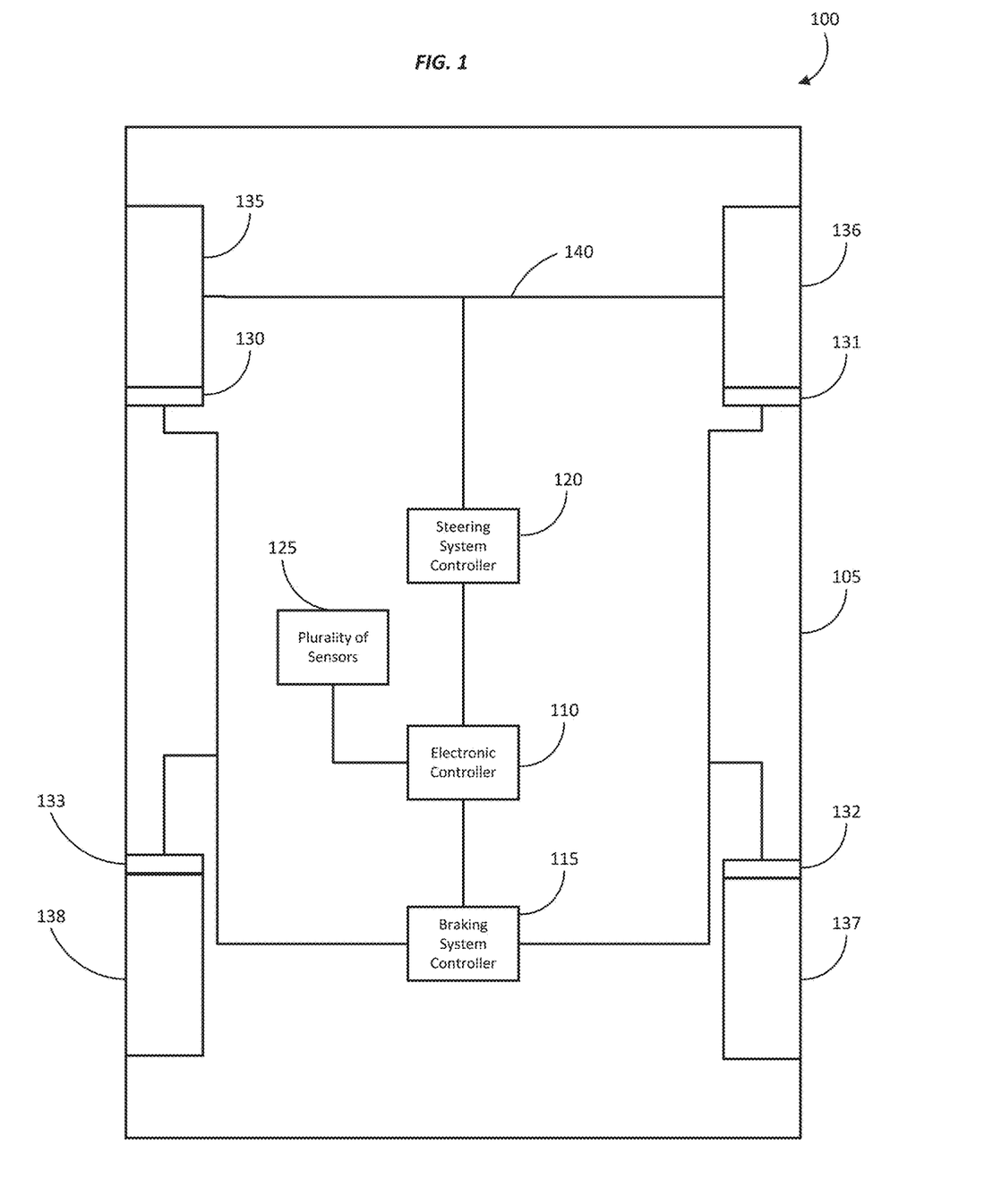
FIG. 1 illustrates a vehicle dynamics control system for a vehicle according to one embodiment.

FIG. 1 illustrates a VDC system 100 for a vehicle 105 according to one embodiment. The system 100 includes an electronic controller 110, a braking system controller 115, a steering system controller 120, and a plurality of sensors 125. The electronic controller 110 is communicatively connected to the braking system controller 115, the steering system controller 120, and the plurality of sensors 125. While the VDC system 100 may be used in conventional automobiles, tractor-trailers, motorcycles, and the like, the VDC system 100 is advantageously used in a HAD vehicle.

Figure 2:
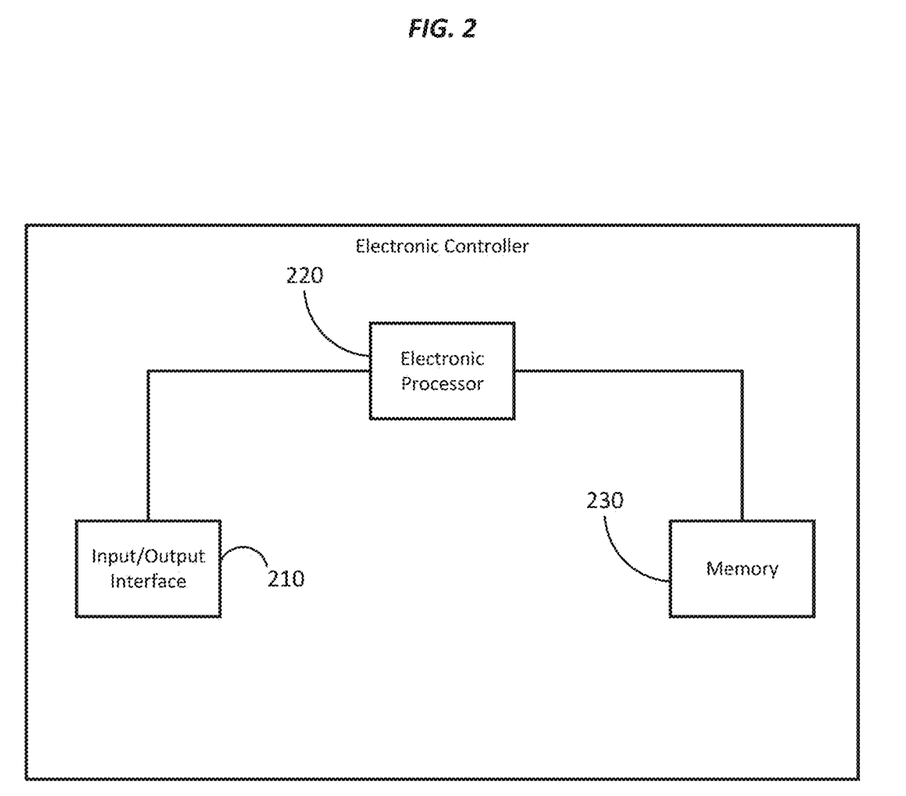
FIG. 2 illustrates an electronic controller according to one embodiment.

The electronic controller 110 is illustrated in FIG. 2 according to one embodiment. In the example shown, the electronic controller 110 includes an input-output interface 210, an electronic processor 220, and a memory 230. In one embodiment, the electronic controller 110 is a proportional-integral-derivative ("PID") controller. However, one of ordinary skill in the art would understand that the electronic controller 110 may be a different type of electronic controller.

The input-output interface 210 allows the electronic processor 220 to communicate with external hardware and software, such as the braking system controller 115, the steering system controller 120, and the plurality of sensors 125. The electronic processor 220 is communicatively connected to the input-output interface 210 and the memory 230. The electronic processor 220 is configured to access the memory 230 and, among other things, execute instructions for the system 100. The electronic processor 220 may be a microprocessor, an application-specific integrated circuit, or a similar processing circuit. The memory 230 is a non-transitory, computer-readable medium and contains instructions that, amongst other things, perform the methods and functions described herein when executed by the electronic processor 220.

Returning to FIG. 1, the braking system controller 115 may be an electronic controller with components similar to the components of the electronic controller 110. The braking system controller 115, in addition to being communicatively coupled to the electronic controller 110, is also electrically coupled to brakes 130-133 of the vehicle 100. The braking system controller 115 is configured to control the brakes 130-133 of the vehicle 100 by, for example, generating a signal or command to apply at least one of the brakes 130-133 to one or more wheels of the vehicle 100, such as wheels 135-138. The brakes 130-133 may have components, such as electric motors, that are actuated in response to the signal or command, or may include microprocessors or other control units that receive the signal or command and, in turn, actuate elements to apply the brakes 130-133 to the wheels 135-138.

The steering system controller 120 may be an electronic controller with components similar to the components of the electronic controller 110. The steering system controller 120, in addition to being communicatively coupled to the electronic controller 110, is also electronically coupled to a steering mechanism 140. The steering mechanism 140 may be a steering rack, a steering shaft, a steering wheel, or some other means for controlling a direction of travel for the vehicle 100. In the embodiment shown in FIG. 1, the steering system controller 120 is electronically coupled to a front steering rack (steering mechanism 14) of the vehicle 100, which is a front-wheel steering vehicle. In other embodiments, the steering system controller 120 is electronically coupled to a rear steering rack or another steering mechanism 140. The steering system controller 120 is configured to generate a signal or command to actuate the steering mechanism 140 to direct the vehicle 100 to travel in a particular direction. The steering mechanism 140 may have components, such as electric motors, that are applied in response to the signal or command, or may include microprocessors or other control units that receive the signal or command and, in turn, actuate the steering mechanism 140.

The plurality of sensors 125 are configured to gather data for the vehicle 100, such as the driving direction of the road, road conditions, current vehicle travel direction, and the like. The plurality of sensors 125 may include radar sensors, LIDAR sensors, cameras, ultrasonic sensors, accelerometers, and the like. The plurality of sensors 125 are communicatively coupled to the electronic controller 110 and are configured to provide data to the electronic controller 110.

Figure 3:
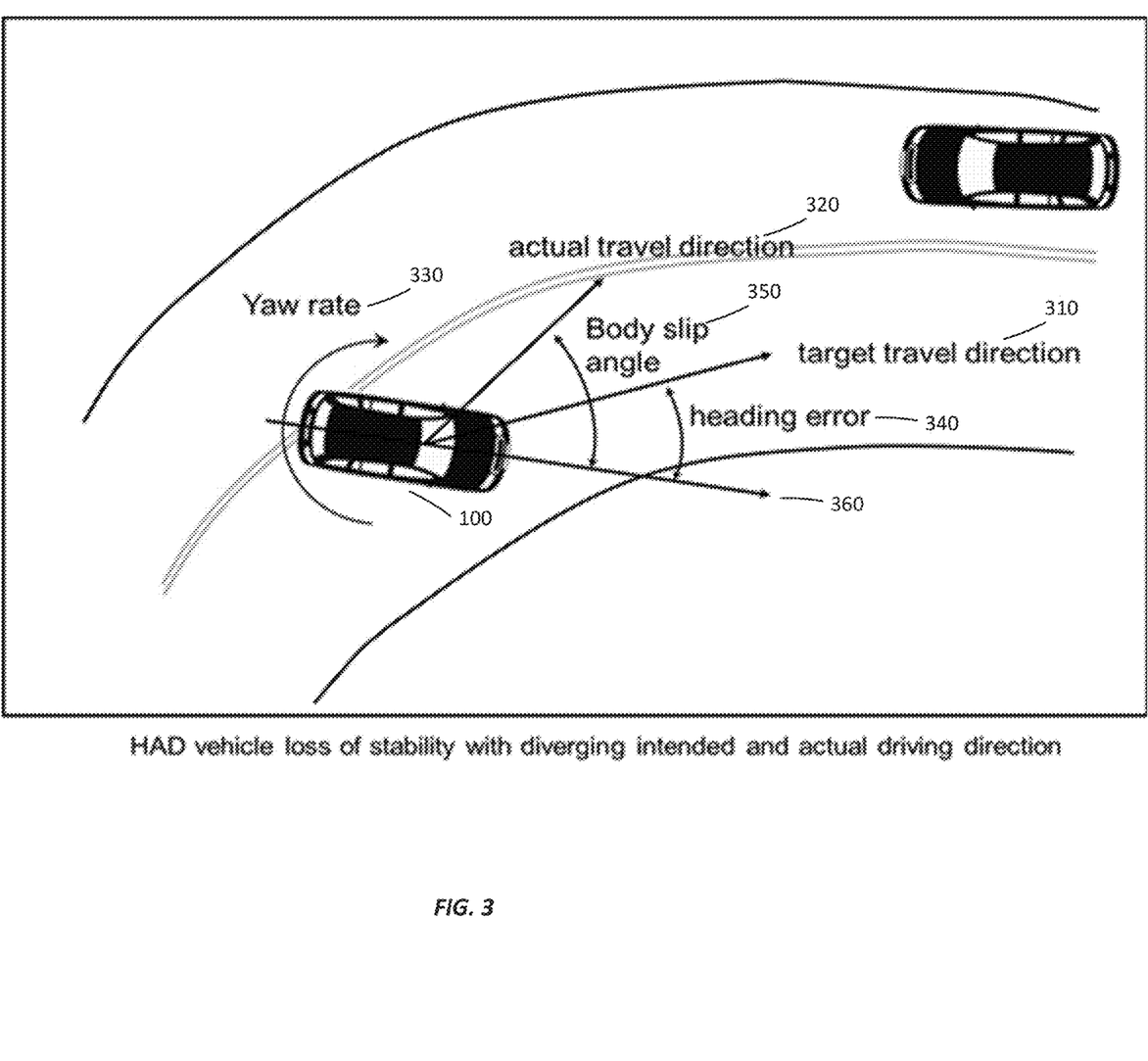
FIG. 3 illustrates a diagram of a vehicle when the vehicle deviates from an intended direction of travel according to one embodiment.

Some or all of the data received by the electronic controller 110 from the plurality of sensors 125 is used or processed by the electronic controller 110 to determine a target (or intended) travel direction and, in some instances, if the vehicle 100 deviates from the target travel direction. For example, FIG. 3 illustrates a diagram of the vehicle 100 when the vehicle 100 deviates from the target travel direction 310.

In one example, the electronic controller 110 determines, from the data from the plurality of sensors 125, the target travel direction 310, an actual travel direction 320, and a yaw rate 330 of the vehicle 100. Based on the yaw rate 330 and the actual travel direction 320, the electronic controller 110 can determine a body slip angle 350, or a difference between the actual travel direction 320 and a heading (such as heading 360) of the vehicle 100. Based on the target travel direction 310 and the yaw rate 330, the electronic controller 110 can determine a heading error 340. The heading error 340 is the angle by which the heading 360 of the vehicle 100 diverges from the target travel direction 310. The electronic controller 110 can also determine a derivative of the heading error 340, or a rate of change of the heading error 340.

Figure 4:
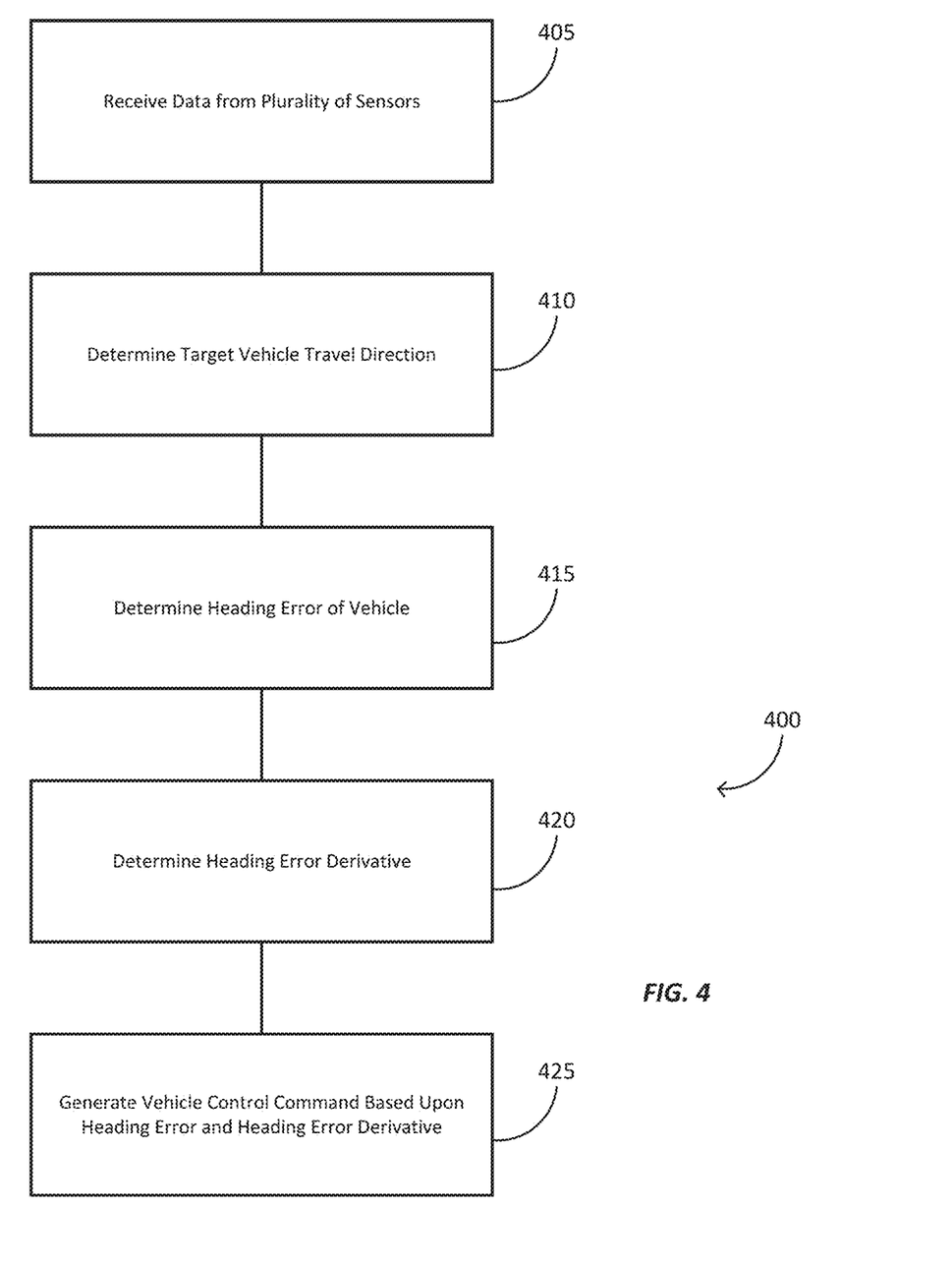
FIG. 4 illustrates a method of controlling a vehicle according to one embodiment.

The data calculated by the electronic controller 110 is then used to control the vehicle 100. For example, FIG. 4 illustrates a method 400 for controlling the vehicle 100 according to one embodiment.

In one example, the method 400 includes receiving, with the electronic controller 110, data from the plurality of sensors 125 (at block 405). In one embodiment, the plurality of sensors 125 includes radar sensors, LIDAR sensors, and cameras, and the electronic controller 110 receives data from each of the plurality of sensors 125.

The method 400 also includes determining, with the electronic controller 110, the target travel direction 310 of the vehicle 100 based on the received data (at block 410). In one embodiment, the electronic controller 110 determines the target travel direction 310 by determining a direction of travel on a driving surface, such as a road. This may be accomplished, for example, by analyzing camera data from the plurality of sensors 125 to identify road markings, road signs, and road boundaries. Based on the image data, the electronic controller 110 can determine an intended direction of travel on the driving surface, and therefore determine the target travel direction 310. In some embodiments, the plurality of sensors 125 includes a global positioning system ("GPS") receiver that receives global positioning data from, for example, a satellite. In these embodiments, the global positioning data may be used to determine a location of the vehicle 100 on a known digital map and, from the position, the target travel direction 310 may be determined. In other embodiments, radar and LIDAR data may be used to identify objects, such as guard railings, other vehicles, and road signs. Based on the identified objects, the electronic controller 110 determines the target travel direction 310.

Based on the target vehicle direction 310 and the other data received from the plurality of sensors 125, the electronic controller 110 determines the heading error 340 of the vehicle 100 (at block 415). In one embodiment, the electronic controller 110 uses the target travel direction 310, the actual travel direction 320, the yaw rate 330, and the heading 360 to determine the heading error 340. Once the heading error 340 is determined, the electronic controller 110 determines the derivative of the heading error 340 (at block 420).

In one example, the heading error 340 and the heading error derivative are used by the electronic controller 110 to generate a vehicle control command (at block 425). In one embodiment, the electronic controller 110 determines, based on the heading error 340 and the heading error derivative, a correcting yaw torque. The correcting yaw torque is used to correct the heading error 340, reduce the yaw rate 330, and allow the vehicle 100 to attempt to have the heading 360 match with the target travel direction 310.

In order to apply the correcting yaw torque, the generated vehicle command, in one embodiment, includes instructions for actuating at least one of the brakes 130-133. The generated vehicle command is then sent by the electronic controller 110 to the braking system controller 115 which, in turn, controls the actuation of at least one of the brakes 130-133 based on the correcting yaw torque to control the yaw rate 330 of the vehicle 100. This correcting yaw torque may be used independent of any driver input from the steering mechanism 140 or in addition to driver input from the steering mechanism 140.

In another embodiment, the electronic controller 110 determines the correcting yaw torque and the generated vehicle command is sent to the steering system controller 120. Based on the correcting yaw torque, the steering system controller 120 calculates a desired steering angle. The steering system controller 120 actuates the steering mechanism 140 to control at least one set of the wheels 135-138 to steer the vehicle 100 at the desired steering angle. For example, if the vehicle 100 may only use front wheels 135-136 to steer the vehicle 100 via the steering mechanism 140.

In an embodiment where the steering mechanism 140 steers both front wheels 135-136 and rear wheels 137-138, the steering system controller 120 receives the generated vehicle command, including the correcting yaw torque, and separates the generated vehicle command into a translational part (the amount of lateral distance and direction of lateral distance needed to bring the vehicle back to the target travel direction 310) and a rotational part (how much the heading 360 of the vehicle 100 must change to align with the target travel direction 310). Based on the translational part and the rotational part, the steering system controller 120 determines the desired steering angle and then actuates the front wheels 135-136 and rear wheels 137-138. The front wheels 135-136 and rear wheels 137-138 may be actuated in-phase (steering the rear wheels 137-138 in the same direction as the front wheels 135-136) or actuated in opposite-phase (steering the rear wheels 137-138 in the opposite direction of the front wheels 135-136).

In addition to steering the vehicle 100, the desired steering angle may be input by the steering system controller 120 or the electronic controller 110 into a vehicle behavior model to determine, based on the desired steering angle, the yaw rate 330, the heading 360, and other data, an expected vehicle response. After the actuation of the steering mechanism 140, the electronic controller 110 may receive data from the plurality of sensors 125 and transmit the data to the steering system controller 120, which in turn analyzes the data to determine an actual vehicle response. The steering system controller 120 may compare the expected vehicle response to the actual vehicle response and, based on the comparison, modify the correcting yaw torque. The steering system controller 120 may then modify the desired steering angle based on the modified correcting yaw torque.

The steering electronic controller 120 may also transmit the modified correcting yaw torque back to the electronic controller 110, which in turn may use the modified correcting yaw torque to generate a new vehicle control command to send to the braking system controller 115. The new vehicle control command may include new instructions for actuating one or more of the brakes 130-133, which are actuated by the braking system controller 115 in addition to the actuation of the steering mechanism 140 by the steering system controller 120.

In any of the embodiments described above, the heading error derivative may be used by the vehicle behavior model to determine when to compare the actual vehicle behavior to the expected vehicle behavior. By using the heading error derivative (rate of change of the heading error 340), the steering system controller 120 or the electronic controller 110 can determine when the vehicle 100 deviates from the target travel direction 310 as soon as possible, and therefore determine the correcting yaw torque and right the vehicle 100 onto the target travel direction 310 before more dangerous situations occur, such as a higher yaw rate, a larger body slip angle, or a larger heading error.

The following examples illustrate example systems and methods described herein. Example 1: a vehicle dynamics control system for a vehicle, the system comprising a plurality of sensors, and an electronic controller configured to receive data from the plurality of sensors; determine a target vehicle travel direction of the vehicle based on the received data; determine a heading error of the vehicle based on the target travel direction of the vehicle; determine a heading error derivative based on the heading error; and generate a vehicle control command based on the heading error and the heading error derivative.

Example 2: the system of example 1, wherein the vehicle control command includes a correcting yaw torque.

Example 3: the system of example 2, wherein the vehicle control command is sent to a braking system controller of the vehicle and the vehicle control command indicates to the braking system controller to provide the correcting yaw torque by actuating at least one brake of the vehicle.

Example 4: the system of any of examples 2-3, wherein the vehicle control command is sent to a steering system controller of the vehicle.

Example 5: the system of example 4, wherein the steering system controller determines a desired steering angle of the vehicle based on the correcting yaw torque.

Example 6: the system of example 5, wherein the steering system controller determines a translational portion of the desired steering angle and a rotational portion of the desired steering angle and is configured to operate at least one set of wheels of the vehicle based on the translational portion and rotational portion.

Example 7: the system of any of examples 5-6, wherein a vehicle response is estimated by the steering system controller based on the desired steering angle.

Example 8: the system of example 7, wherein the desired steering angle is modified if the vehicle response is different than estimated.

Example 9: the system of any of examples 1-8, wherein the plurality of sensors includes at least one LIDAR sensor, one RADAR sensor, and one camera.

Example 10: the system of any of examples 1-9, wherein the heading error is an angle of deviation of a heading of the vehicle from the intended vehicle travel direction.

Example 11: a method for controlling a vehicle, the method comprising receiving, with an electronic controller, data from a plurality of sensors; determining, with the electronic controller, a target vehicle travel direction of the vehicle based on the received data; determining, with the electronic controller, a heading error from the target vehicle travel direction of a current vehicle travel direction; determining, with the electronic controller, a heading error derivative; and generating, with the electronic controller, a vehicle control command based on the heading error and the heading error derivative.

Example 12: the method of example 11, wherein the vehicle control command includes a correcting yaw torque.

Example 13: the method of example 12, wherein the vehicle control command is sent to a braking system controller of the vehicle and the vehicle control command indicates to the braking system controller to provide the correcting yaw torque by actuating at least one brake of the vehicle.

Example 14: the method of any of examples 12-13, wherein the vehicle control command is sent to a steering system controller of the vehicle.

Example 15: the method of example 14, wherein the steering system controller determines a desired steering angle of the vehicle based on the correcting yaw torque.

Example 16: the method of example 15, wherein the steering system controller determines a translational portion of the desired steering angle and a rotational portion of the desired steering angle and is configured to operate at least one set of wheels of the vehicle based on the translational portion and rotational portion.

Example 17: The method of any of examples 15-16, wherein a vehicle response is estimated by the steering system controller based on the desired steering angle.

Example 18: The method of example 17, further comprising modifying, with the steering system controller, the desired steering angle if the vehicle response is different than estimated.

Example 19: The method of any of examples 11-18, wherein the plurality of sensors includes at least one LIDAR sensor, one RADAR sensor, and one camera.

Example 20: The method of any of examples 11-18, wherein the heading error is an angle of deviation of the current vehicle travel direction from the intended vehicle travel direction.

Thus, embodiments described herein provide, among other things, systems and methods for controlling a vehicle. Various features, advantages, and embodiments are set forth in the following claims.

What is claimed is:

1. A vehicle dynamics control system for a vehicle, the system comprising
a plurality of sensors, and
an electronic controller configured to
receive data from the plurality of sensors;
determine a target vehicle travel direction of the vehicle based on the received data;
determine a heading error of the vehicle based on the target travel direction of the vehicle;
determine a heading error derivative based on the heading error, wherein the heading error derivative includes a rate of change of a distance corresponding to the heading error; and
generate a vehicle control command based on the heading error and the heading error derivative, wherein the vehicle control command includes a correcting yaw torque.

2. The system of claim 1, wherein the vehicle control command is sent to a braking system controller of the vehicle and the vehicle control command indicates to the braking system controller to provide the correcting yaw torque by actuating at least one brake of the vehicle.

3. The system of claim 1, wherein the vehicle control command is sent to a steering system controller of the vehicle.

4. The system of claim 3, wherein the steering system controller determines a desired steering angle of the vehicle based on the correcting yaw torque.

5. The system of claim 4, wherein the steering system controller determines a translational portion of the desired steering angle and a rotational portion of the desired steering angle and is configured to operate at least one set of wheels of the vehicle based on the translational portion and rotational portion.

6. The system of claim 4, wherein a vehicle response is estimated by the steering system controller based on the desired steering angle.

7. The system of claim 6, wherein the desired steering angle is modified if the vehicle response is different than estimated.

8. The system of claim 1, wherein the plurality of sensors includes at least one LIDAR sensor, one RADAR sensor, and one camera.

9. The system of claim 1, wherein the heading error is an angle of deviation of a heading of the vehicle from an intended vehicle travel direction.

10. A method for controlling a vehicle, the method comprising receiving, with an electronic controller, data from a plurality of sensors;
determining, with the electronic controller, a target vehicle travel direction of the vehicle based on the received data;
determining, with the electronic controller, a heading error from the target vehicle travel direction of a current vehicle travel direction;
determining, with the electronic controller, a heading error derivative, wherein the heading error derivative includes a rate of change of a distance corresponding to the heading error; and
generating, with the electronic controller, a vehicle control command based on the heading error and the heading error derivative, wherein the vehicle control command includes a correcting yaw torque.

11. The method of claim 10, wherein the vehicle control command is sent to a braking system controller of the vehicle and the vehicle control command indicates to the braking system controller to provide the correcting yaw torque by actuating at least one brake of the vehicle.

12. The method of claim 10, wherein the vehicle control command is sent to a steering system controller of the vehicle.

13. The method of claim 12, wherein the steering system controller determines a desired steering angle of the vehicle based on the correcting yaw torque.

14. The method of claim 13, wherein the steering system controller determines a translational portion of the desired steering angle and a rotational portion of the desired steering angle and is configured to operate at least one set of wheels of the vehicle based on the translational portion and rotational portion.

15. The method of claim 13, wherein a vehicle response is estimated by the steering system controller based on the desired steering angle.

16. The method of claim 15, further comprising modifying, with the steering system controller, the desired steering angle if the vehicle response is different than estimated.

17. The method of claim 10, wherein the plurality of sensors includes at least one LIDAR sensor, one RADAR sensor, and one camera.

18. The method of claim 10, wherein the heading error is an angle of deviation of the current vehicle travel direction from an intended vehicle travel direction.

* * * * *